United States Patent
Gou et al.

(10) Patent No.: US 11,558,176 B2
(45) Date of Patent: Jan. 17, 2023

(54) APPARATUS AND METHOD FOR GENERATING CIPHERTEXT DATA WITH MAINTAINED STRUCTURE FOR ANALYTICS CAPABILITY

(71) Applicant: LG ELECTRONICS INC., Seoul (KR)

(72) Inventors: Dayin Gou, Santa Clara, CA (US); Harsh Kupwade Patil, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 565 days.

(21) Appl. No.: 16/479,178

(22) PCT Filed: Feb. 14, 2018

(86) PCT No.: PCT/KR2018/001973
§ 371 (c)(1),
(2) Date: Jul. 18, 2019

(87) PCT Pub. No.: WO2018/151552
PCT Pub. Date: Aug. 23, 2018

(65) Prior Publication Data
US 2019/0372754 A1 Dec. 5, 2019

Related U.S. Application Data

(60) Provisional application No. 62/459,581, filed on Feb. 15, 2017.

(51) Int. Cl.
*H04L 29/06* (2006.01)
*H04L 9/06* (2006.01)
(Continued)

(52) U.S. Cl.
CPC .......... *H04L 9/0631* (2013.01); *G06F 17/153* (2013.01); *G06N 3/02* (2013.01)

(58) Field of Classification Search
CPC .............................. H04L 9/0631; H04L 9/618
See application file for complete search history.

(56) References Cited

U.S. PATENT DOCUMENTS

| 2010/0281336 A1* | 11/2010 | Seurin | H04L 9/0838 714/755 |
| 2013/0064362 A1* | 3/2013 | Tang | H04L 9/16 380/28 |

(Continued)

OTHER PUBLICATIONS

PCT International Application No. PCT/KR2018/001973, Notification of Transmittal of the International Search Report and the Written Opinion of the International Searching Authority, or Declaration dated Jun. 7, 2018, 12 pages.

*Primary Examiner* — Dao Q Ho
(74) *Attorney, Agent, or Firm* — Lee Hong Degerman Kang & Waimey

(57) ABSTRACT

A method for providing ciphertext data by a first computing device having memory includes obtaining, from the memory, plaintext data having a structure; providing the plaintext data to a structure preserving encryption network (SPEN) to generate the ciphertext data, where the structure of the plaintext data corresponds to a structure of the ciphertext data; and communicating, from the first computing device to a second computing device, the ciphertext data to permit analysis on the ciphertext data.

14 Claims, 10 Drawing Sheets

(51) Int. Cl.
    *G06F 17/15*     (2006.01)
    *G06N 3/02*     (2006.01)

(56) References Cited

U.S. PATENT DOCUMENTS

| | | |
|---|---|---|
| 2013/0094649 A1* | 4/2013 | Tomlinson ............ H04L 9/3026 380/30 |
| 2013/0168450 A1 | 7/2013 | von Mueller et al. |
| 2014/0101438 A1 | 4/2014 | Elovici et al. |
| 2015/0358159 A1 | 12/2015 | Rozenberg et al. |
| 2016/0036584 A1 | 2/2016 | Nikolaenko et al. |
| 2016/0350648 A1 | 12/2016 | Gilad-Bachrach et al. |
| 2018/0189502 A1* | 7/2018 | Kumar ................. H04L 9/0863 |

\* cited by examiner

[Fig. 1]
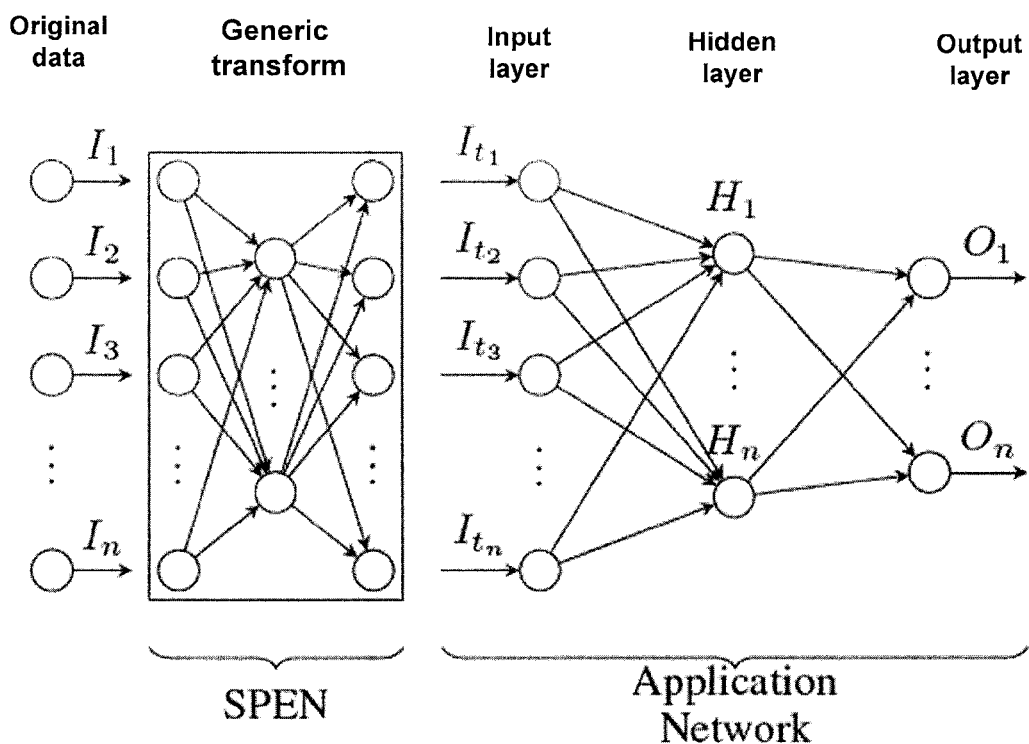

[Fig. 2]

| Label | Layer 0 | Layer 1 | Layer 2 | Layer 3 | Layer 4 | Layer 5 | Layer 6 | Layer 7 | Model Size | Comment |
|---|---|---|---|---|---|---|---|---|---|---|
| H0-0 | I/P 64 | O/P softplus 64 | | | | | | | 4160 | G |
| H0-1 | I/P 64 | O/P softplus 64 | | | | | | | 4160 | R |
| Hs-2 | I/P 64 | D. TanH 64 | O/P TanH 64 | | | | | | 8320 | R |
| Hs-3 | I/P 64 | D. ReLU 64 | O/P TanH 64 | | | | | | 8320 | G |
| Hs-4 | I/P 64 | D. TanH 64 | O/P TanH 64 | | | | | | 8320 | R |
| Hm-1 | I/P 64 | D. TanH 128 | ⊗ | D TanH, 64 | ⊗ | D TanH, 128 | ⊗ | D TanH, 64 | 33152 | R |
| Hm-2 | I/P 64 | D. TanH 48 | ⊗ | D TanH, 128 | ⊗ | D TanH, 48 | ⊗ | D TanH, 48 | 18720 | R |
| Hm-3 | I/P 64 | D. TanH 64 | ⊗ | D TanH, 64 | ⊗ | D TanH, 64 | ⊗ | D TanH, 64 | 16640 | R |

I/P = Input, O/P = Output, D = Dense, ⊗ = Dropout = 0.01, G = Guided initialization and R = Random initialization

[Fig. 3A]
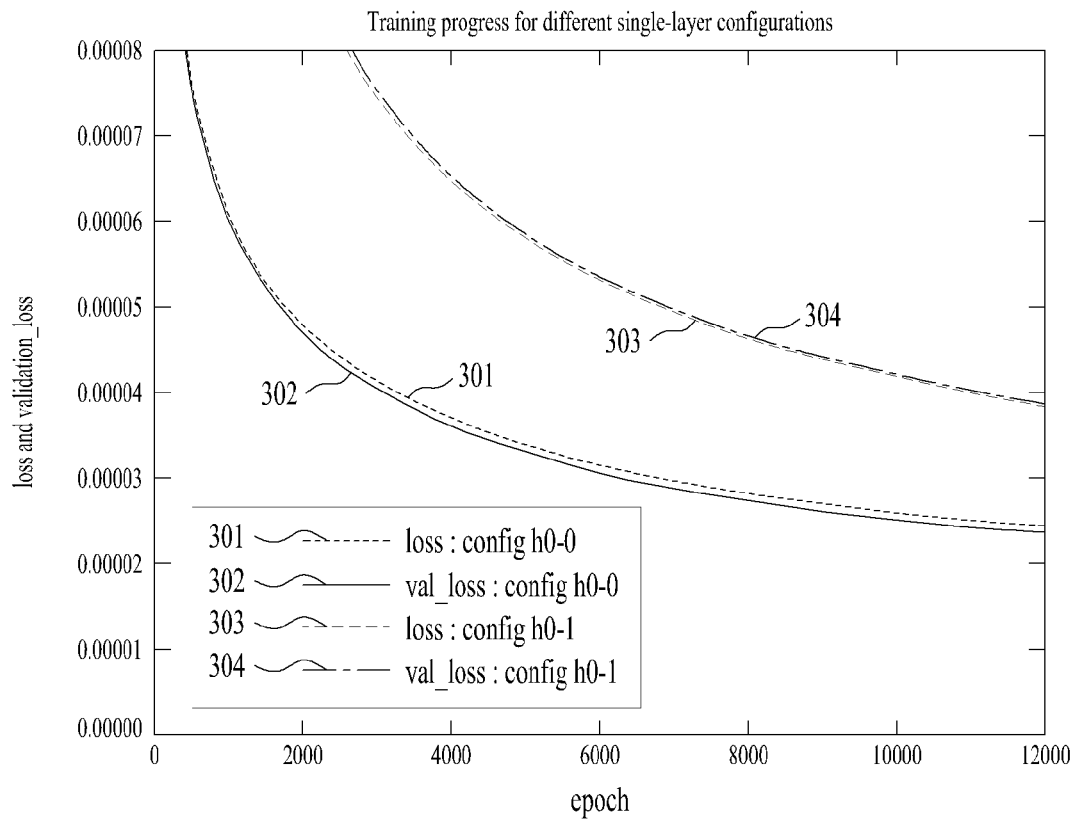
[Fig. 3B]
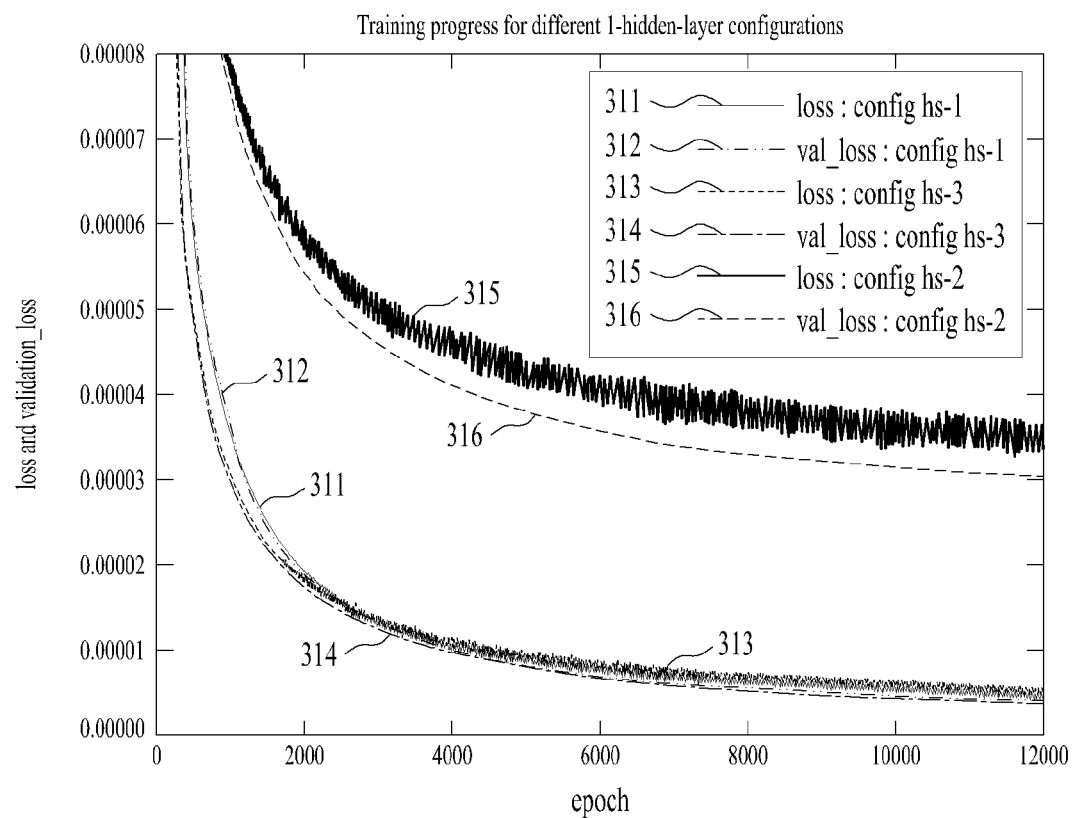

[Fig. 3C]
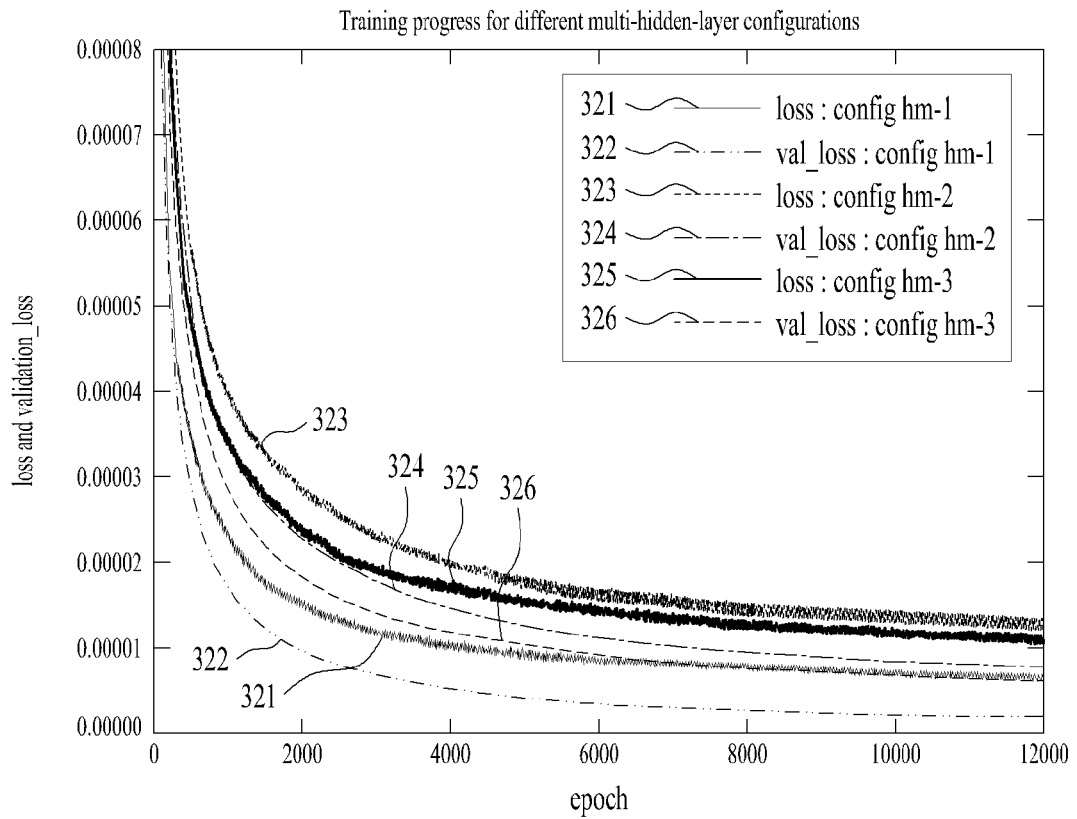
[Fig. 4A]
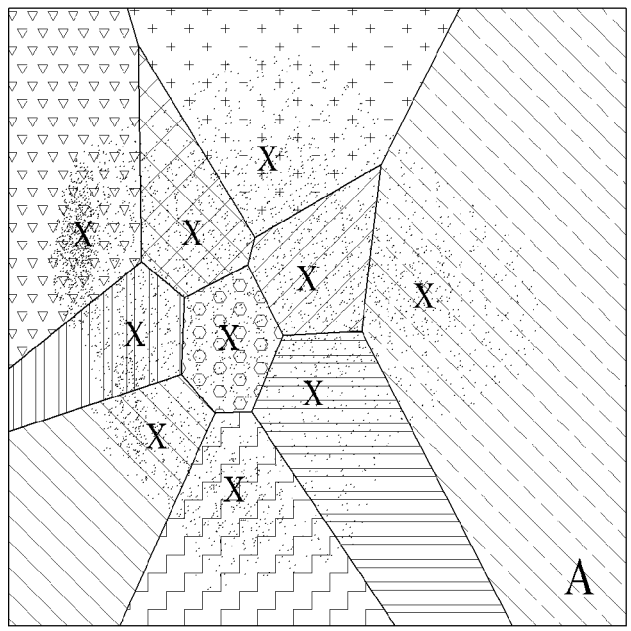

[Fig. 4B]
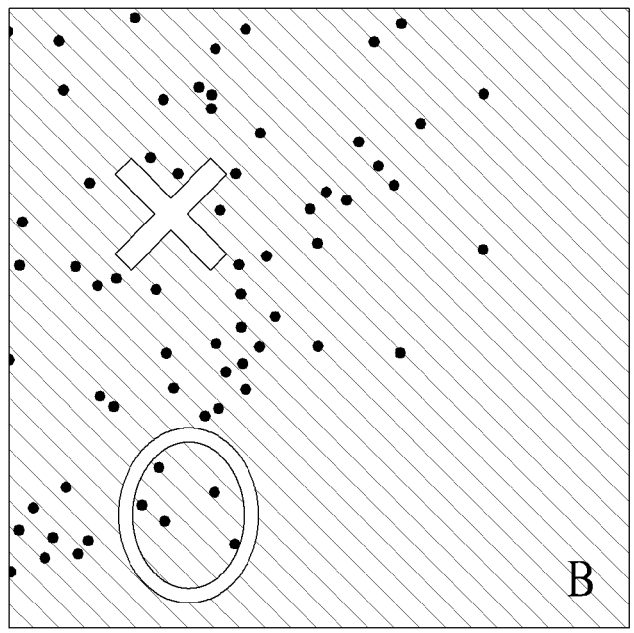
[Fig. 4C]
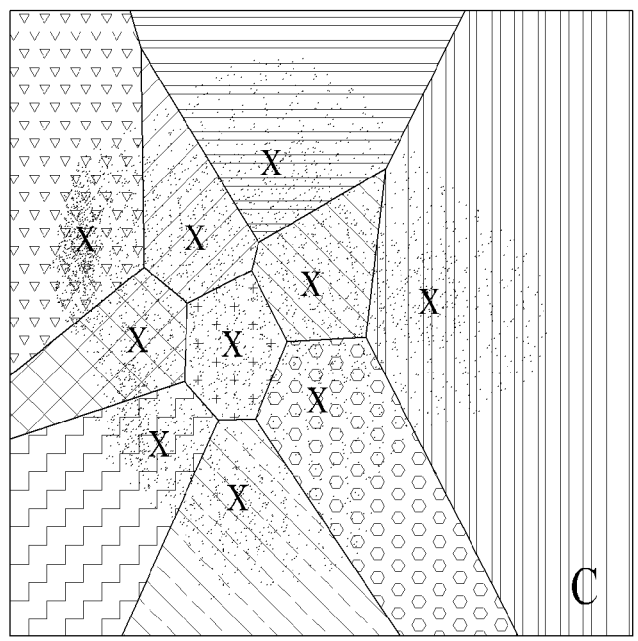

[Fig. 4D]
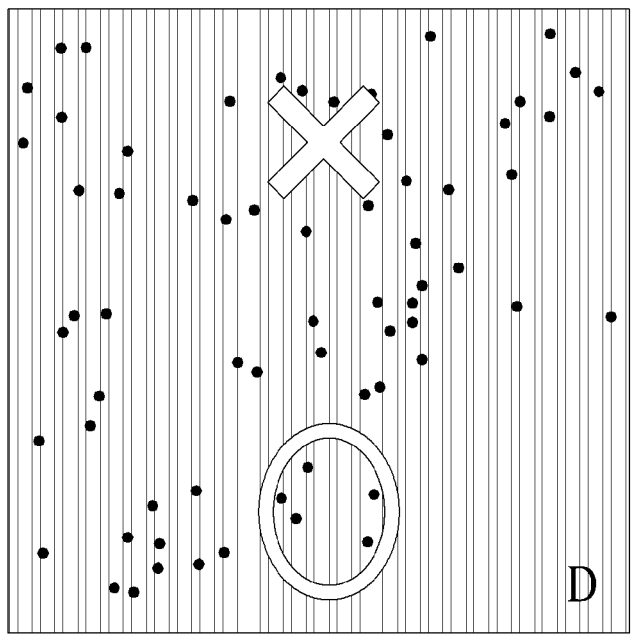
[Fig. 5]
| Category | Error rate |
|---|---|
| Original data in plaintext domain | 1.49% |
| Data in ciphertext domain with pure isometric transformation | 1.81% |
| Data in ciphertext with encryption networks | 2.41% |
| Dummy-dimension enhanced data in ciphertext domain | 2.43% |
| Dummy-dimension enhanced data with split sub-classes in ciphertext domain | 2.92% |
[Fig. 6A]
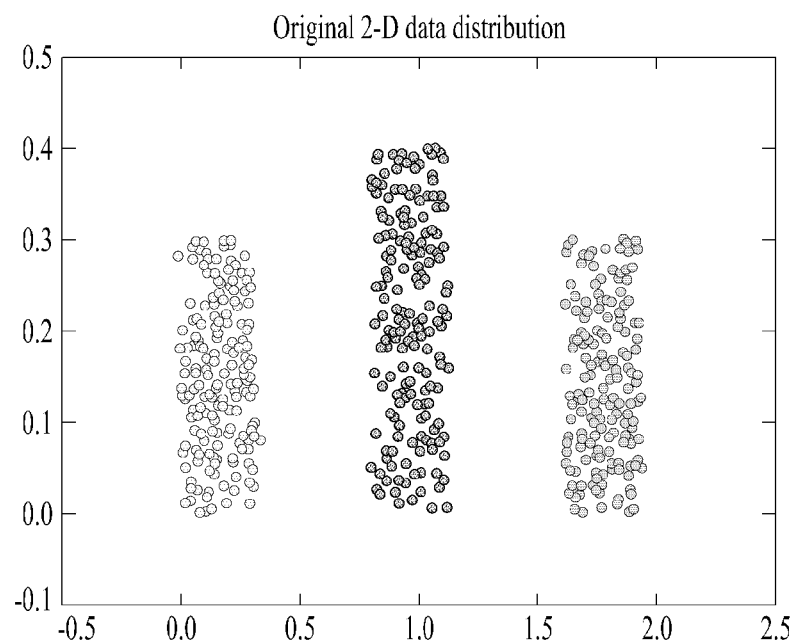

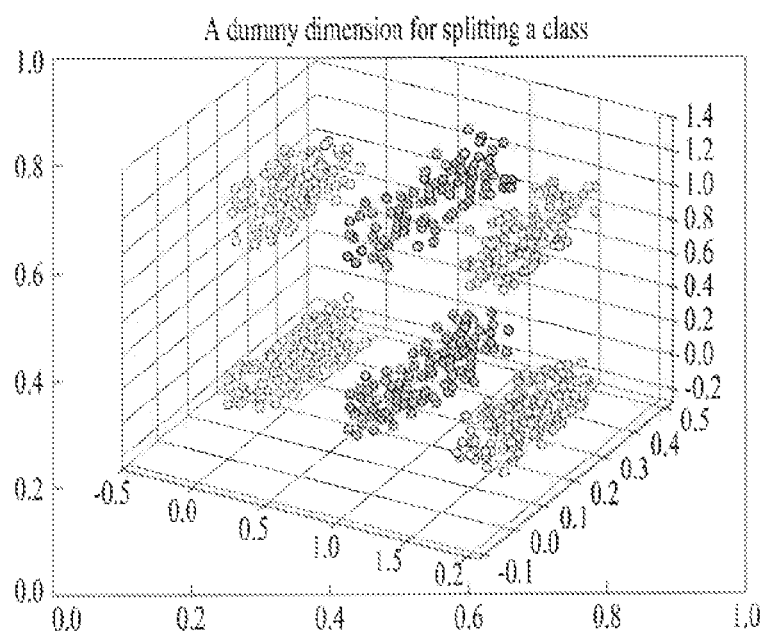
[Fig. 6B]
[Fig. 6C]
[Fig. 6D]

[Fig. 6E]
| Scrambled class label | Actual class label |
|---|---|
| 1 | 0 |
| 19 | 0 |
| 2 | 2 |
| 16 | 3 |
| 3 | 2 |
| 17 | 2 |
| 4 | 3 |
| 18 | 3 |
| 5 | 4 |
| 15 | 4 |
| 6 | 5 |
| 14 | 5 |
| 7 | 6 |
| 13 | 6 |
| 8 | 7 |
| 12 | 7 |
| 9 | 8 |
| 11 | 8 |
| 0 | 9 |
| 10 | 9 |
[Fig. 7]
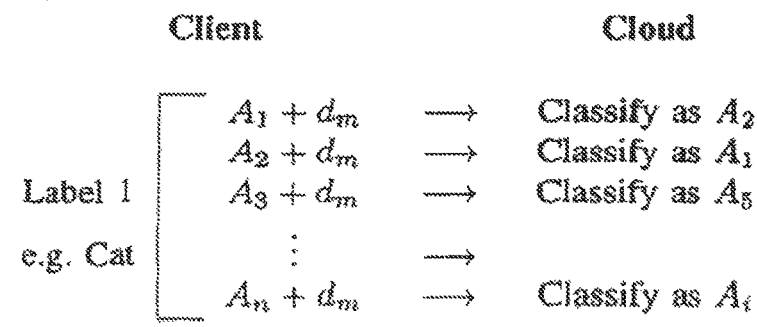
[Fig. 8]
$$\text{Label 1, e.g. Cat} \begin{bmatrix} A_1 + d_m & \longrightarrow & \text{Classify as } A_2 \\ A_2 + d_m & \longrightarrow & \text{Classify as } A_1 \\ A_3 + d_m & \longrightarrow & \text{Classify as } A_5 \\ \vdots & \longrightarrow & \\ A_n + d_m & \longrightarrow & \text{Classify as } A_t \end{bmatrix}$$
Client · Cloud
[Fig. 9]
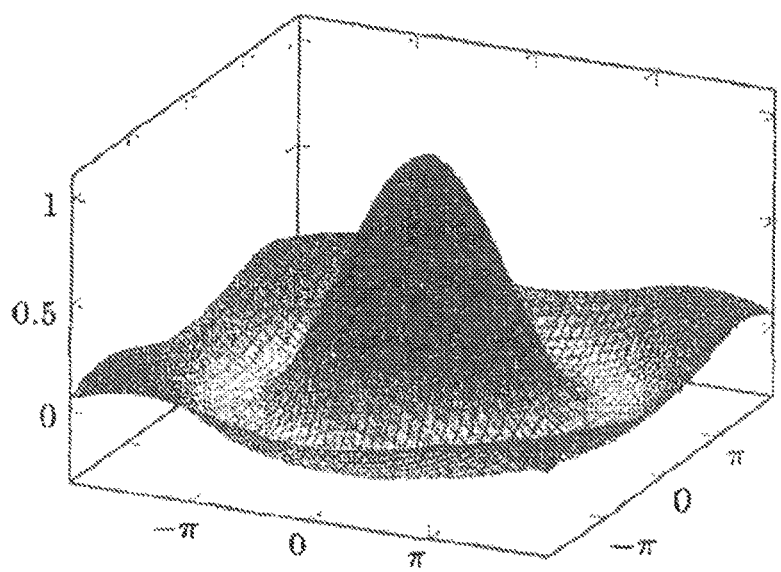

[Fig. 10]
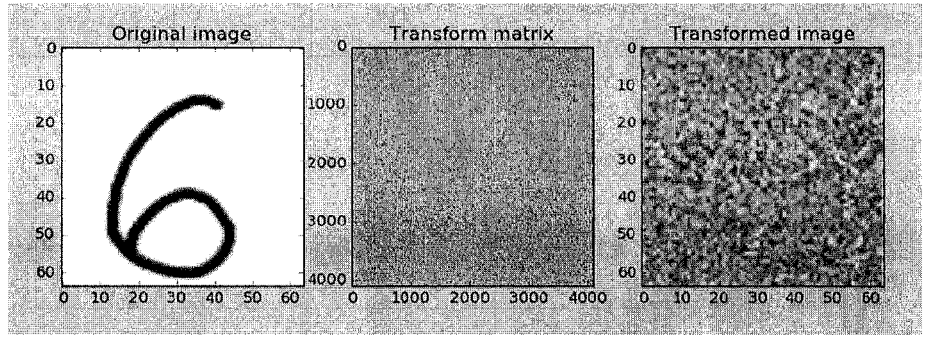
[Fig. 11]
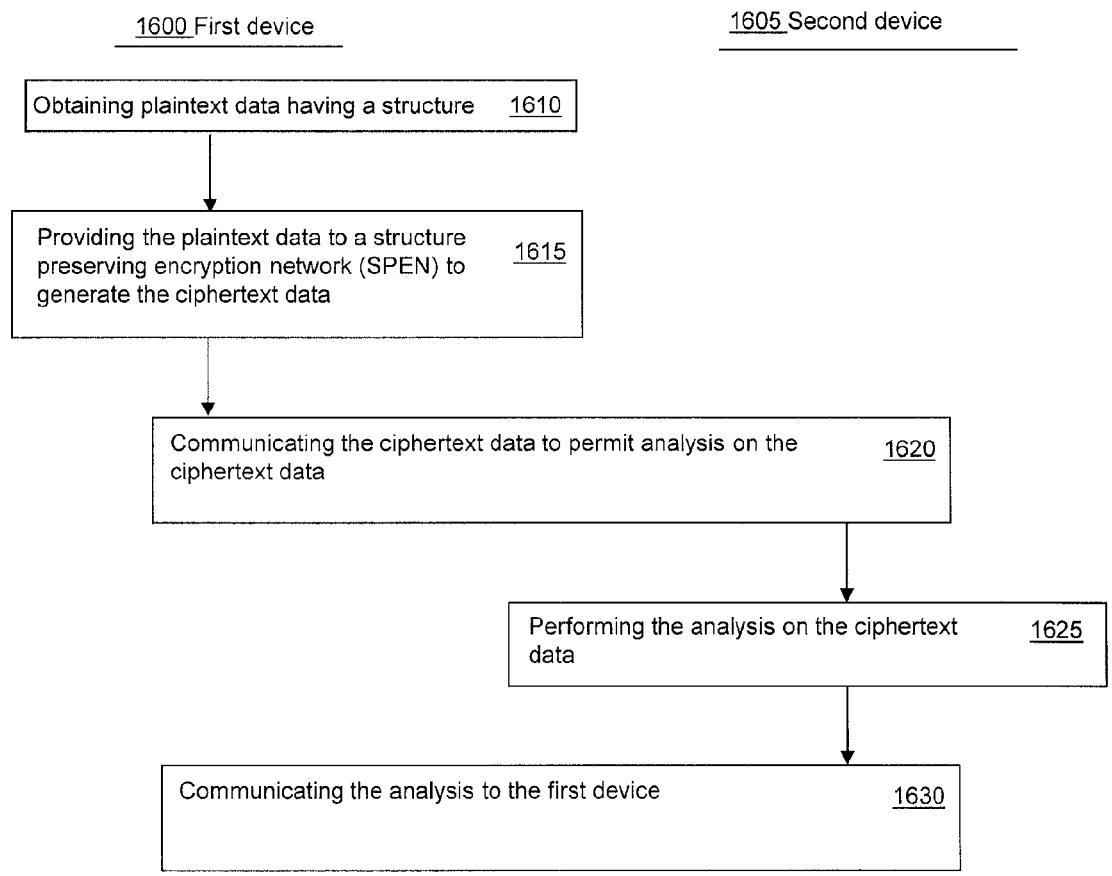

[Fig. 12]
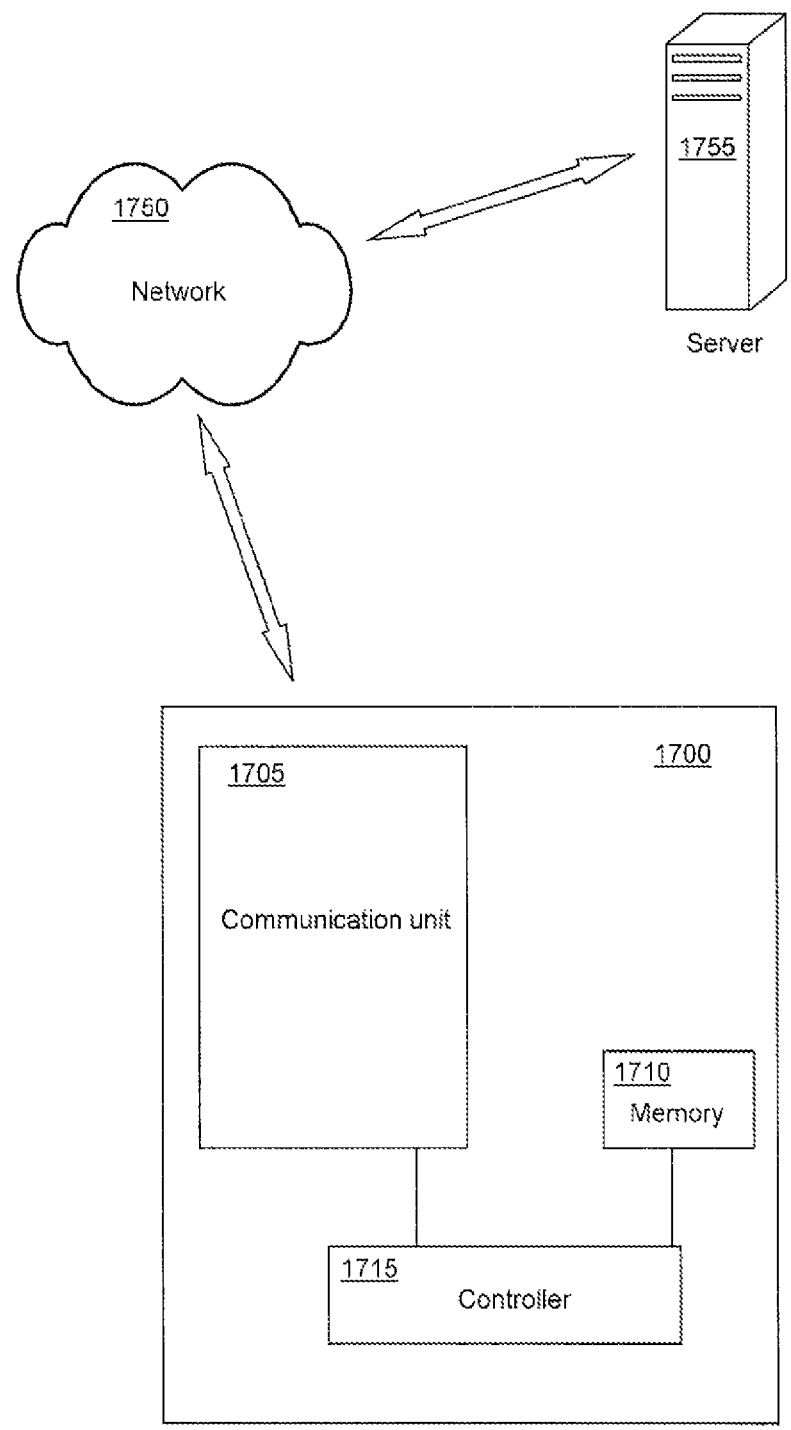

APPARATUS AND METHOD FOR GENERATING CIPHERTEXT DATA WITH MAINTAINED STRUCTURE FOR ANALYTICS CAPABILITY

CROSS-REFERENCE TO RELATED APPLICATIONS

This application is the National Stage filing under 35 U.S.C. 371 of International Application No. PCT/KR2018/001973, filed on Feb. 14, 2018, which claims the benefit of U.S. Provisional Application No. 62/459,581, filed on Feb. 15, 2017, the contents of which are all hereby incorporated by reference herein in their entirety.

TECHNICAL FIELD

The present invention generally relates to generating ciphertext data, and in particular, to generating ciphertext data having a structure that corresponds to structure of plaintext data.

BACKGROUND ART

With the rapid development of artificial intelligence, data has become an indispensable asset. Along with the burgeoning of massive amounts of data, security and privacy concerns are increasing. In order to address some of these concerns, traditional schemes such as homomorphic encryption and differential privacy are often proposed.

Disclosure of Invention

Technical Problem

However, these are often unsuitable for practical applications due to increased resource requirements stemming from higher degree polynomials and larger key sizes.

Solution to Problem

In accordance with an embodiment, a method for providing ciphertext data by a first computing device having memory includes obtaining, from the memory, plaintext data having a structure; providing the plaintext data to a structure preserving encryption network (SPEN) to generate the ciphertext data, wherein the structure of the plaintext data corresponds to a structure of the ciphertext data; and communicating, from the first computing device to a second computing device, the ciphertext data to permit analysis on the ciphertext data.

In accordance with another embodiment, an apparatus for providing ciphertext data includes a memory configured to store plaintext data having a structure; a communication unit; and a controller operatively coupled to the communication unit. The controller is configured to: provide the plaintext data to a structure preserving encryption network (SPEN) to generate the ciphertext data, wherein the structure of the plaintext data corresponds to a structure of the ciphertext data; and cause the communication unit to communicate, to a computing device, the ciphertext data to permit analysis on the ciphertext data.

In accordance with yet another embodiment, a computer program product comprising a non-transitory computer readable medium having a computer readable program stored therein, wherein the computer readable program, when executed by a first computing device, causes the first computing device to: obtain, from a memory of the first computing device, plaintext data having a structure; provide the plaintext data to a structure preserving encryption network (SPEN) to generate ciphertext data, wherein the structure of the plaintext data corresponds to a structure of the ciphertext data; and communicate, from the first computing device to a second computing device, the ciphertext data to permit analysis on the ciphertext data.

These and other embodiments will also become readily apparent to those skilled in the art from the following detailed description of the embodiments having reference to the attached figures, the invention not being limited to any particular embodiment disclosed.

Advantageous Effects of Invention

The above and other aspects, features, and advantages of the present invention will become more apparent upon consideration of the following description of preferred embodiments, taken in conjunction with the accompanying drawing figures.

BRIEF DESCRIPTION OF DRAWINGS

FIG. 1 depicts a framework for data analytics using ciphertext data transformed from original plaintext data.

FIG. 2 is a table with a summary of exemplary different configurations according to embodiments of the present invention.

FIGS. 3A-3C are graphs showing examples of training progress for different SPEN configurations.

FIGS. 4A-4D show clustering of points in the ciphertext and plaintext domains.

FIG. 5 depicts a table showing error rates of scenarios of input samples going through different transforms.

FIG. 6A shows a contrived low dimensional example in 2-D, and FIG. 6B shows a 3-D example, which illustrate how a dummy dimension will be added to split one class into two sub-classes.

FIGS. 6C, 6D, and 6E show examples of how to re-assign a label when an original class is split into two sub-classes.

FIG. 7 depicts a table showing PCA execution times comparison among homomorphic encrypted input, plaintext input, and SPEN encrypted input.

FIG. 8 is an example of data representation in one dimension.

FIG. 9 is a graph depicting an example of a Gaussian function.

FIG. 10 depicts the SPEN transformation of a handwritten digit 6.

FIG. 11 is a flowchart of a method for providing ciphertext data by a computing device in accordance with embodiments of the present invention.

FIG. 12 is a block diagram of a cloud network environment in accordance with the present disclosure.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In the era of "big data", along with security, privacy concerns continue to increase. In order to satisfy some of these concerns, traditional schemes such as homomorphic encryption and differential privacy have been implemented. However, the need remains for higher degree polynomials and larger key sizes, thereby drastically increasing compute time and storage capacity. Moreover, the privacy problem exacerbates with "big data" analytics. With homomorphic encryption, there are two realizations: interactive and non-interactive schemes.

In the case of the interactive scheme, considering the client-server model, the client is involved during operation on encrypted data by the server. On the other hand, a non-interactive scheme does not typically require client's participation and all operations on encrypted data are exclusively carried by the server. Although homomorphically (fully (F), somewhat (SW) or yet another somewhat (YASW)) encrypted data can be used to perform minimal analytical operations, it is still computationally inefficient and impractical. In addition, a recent study on computing principal component analysis (PCA) on yet another somewhat homomorphic encryption (YASHE) has shown the feasibility of performing analytics on encrypted data, but the execution times to compute principal components is prohibitively slow. As a result, the need for alternative solutions has been increasing.

Recently, the disclosure of the subfield lattice attack on overstretched NTRU assumptions (which was the security basis for several homomorphic encryption schemes), insinuates the case to increase the degree of the curve polynomial. However, with such an increase, the computing time on encrypted data may be even more time-consuming. Lately, neural networks were used to make encrypted predictions. Although this model achieved higher accuracy (e.g., about 99%), it is with a caveat that the model was trained on plain-text data.

One straightforward solution to help alleviate privacy concerns is to store encrypted data and still allow the cloud provider or any authorized entity to perform computations on the data. A mathematical answer to this complex question is homomorphic or malleable encryption. In general, the problem of computing any function on encrypted data has been a challenging problem and stems back to the initial work done by Rivest, Adleman and Dertouzous on general privacy homomorphism, where homomorphic encryption (HE) is its subset. However, the proposed schemes were proved insecure and the construction of a fully homomorphic encryption (FHE) scheme that facilitates unlimited additions and multiplications on cipher text remained an open research problem for almost three decades.

Finally, in 2009, Craig Gentry was able to construct an FHE scheme based on ideal lattices. This achievement has led to a new generation of cryptographic algorithms. Prior to Gentry's scheme, HE schemes could typically only process encrypted data using either an addition or multiplication operation. In addition, there is overhead in generating application specific protocols that require linearizing computations and involve multiparty computations. In Gentry's scheme, any third party was able to perform complex computations on encrypted data using both addition and multiplication operations without knowing the encryption key. Furthermore, this scheme allows direct computation of permitted polynomial functions on encrypted data and eliminates the need for linearizing computations.

Gentry's blueprint includes a somewhat HE (SWHE) scheme and a bootstrapping mechanism. The SWHE, restricted to "low-degree" polynomial functions, permits unlimited additions and a bounded number of multiplication operations. In spite of this limitation, SWHE can still process several functions used in various applications. Hence, in order to support a low-degree polynomial, the SWHE scheme squashes the decryption scheme. However, each arithmetic operation comes at a price. Computations on cipher texts are generally "noisy" and increase exponentially with multiplication operations.

In the case of the bootstrapping mechanism, an SWHE scheme can evaluate its own decryption function using the secret key shared via the secure channel, resulting in reduced noise. However, Gentry's scheme has several drawbacks in terms of increased computational complexity and larger key sizes, thereby making them unusable in real applications. As a result, HE has not seen wide acceptance in the healthcare industry, for example. However, there is considerable research activity to improve the efficiency of this scheme. In order to improve the efficiency, Brakerski et. al. takes an unconventional approach that eliminates bootstrapping, bases security on weaker assumptions and relies on Learning With Error (LWE) or the ring-LWE problem.

While Gentry's construction of a FHE scheme based on ideal lattices was a stepping-stone in cryptography, its practical implementation met with efficiency bottlenecks, and its ability to solve real-world problems has not been realized. Recent advances in algorithms considerably improve the efficiency of a FHE and are more applicable than ever before. For example, efficiency in homomorphic encryption is largely determined by the size of the cipher text and ensuring polynomial bounding to the security parameter, all through repeated computations. In addition, efficiency can be increased either by assuming circular security and implementing an expensive bootstrapping operation, or by extending the parameter sizes to enable a "levelled FHE" scheme which can evaluate circuits of large degree (exponential in the number of levels).

Along with homomorphic encryption, at present is the notation of differential privacy. This model leverages the evolution of statistical science that can learn as much as information about the group with little to no inference about individual's data present in the same group. However, in the context of deep learning, there may be some applicability of differential privacy, but this may pose serious challenges during the inference phase as there is a need to examine a single record.

Presented herein are solutions using machine learning-based encryption called Structure Preserving Encryption Networks (SPEN). SPEN uses encryption networks to transform data from plaintext domain into ciphertext domain. The encryption network preserves the overall structure of the dataset, which is useful for data analytics, without incurring any privacy leakage. Description is provided herein as to how the encryption networks may be constructed along with verifying examples with clustering and classification. In addition, dummy dimensions may be implemented to enhance security. Further, MNIST handwritten digit recognition error rates is presented to show proof of concept on how analytics can be conducted in ciphertext domain and principal component analysis computation time is presented to show the significantly better performance of SPEN when compared to conventional schemes.

On the very high level and generic level, embodiments of the present invention can be thought of as a generic high dimensional metrical vector space transformation, while SPEN can be thought of as an implementation of this transformation using deep neural networks. A degenerate case of this very generic transformation is isometric transform, where only linear transforms are used, and where the 2-D and 3-D version can be visualized to facilitate concept understanding. However, it should be emphasized that the invention here goes much wider and deeper than isometric transform. An example implementation of this model is the SPEN, which through machine learning still protects privacy. This feature is lightweight and faster when compared to the homomorphic encryption model. Other features include augmenting data samples with dummy dimensions and random data on the dummy dimensions, use of random unique secret data for every different session to generate reference output for given input during neural network training.

Structure Preserving Encryption Networks (SPEN)

In an embodiment, one way of doing data analytics without privacy leakage is to convert plaintext domain into a ciphertext domain with the overall structure of the dataset still being preserved. FIG. 1 depicts a framework for such data analytics using an original data sample in the plaintext domain. In this figure, this data sample is fed into a SPEN to generate a corresponding sample in the ciphertext domain, which is then fed into the application network (e.g. a classification network) for data analytics.

In general, a vector in high dimension beyond 3 D cannot be visualized. To illustrate the idea in an intuitive way, we review a 2-D image as a special case and treat the pixel values as a vector and thus make the vector visualizable. Referring ahead to FIG. 10, an image of digit "6" is shown in its original plaintext domain, the transform (simplified as an matrix by removing nonlinearity), and the output in the ciphertext domain. As can be seen from the transformed image, the original correlation between different dimensions are completely scrambled, and it becomes difficult to make sense of what the image represents. With nonlinearity added, the mapping function essentially becomes a non-reversible function (in general, the reverse function will not even exist), and this will become even harder to unscramble.

Embodiments of the present invention provide for many variations depending on different applications. For example, the encryption network can be incorporated into client software and/or the application network can run on servers. Furthermore, the encryption and analytics can be implemented in other formats, but for clarity of discussion various embodiments will be discussed with reference to use of neural networks.

Isometric Transformation

In order to understand SPEN, we start with one of its degenerate cases. When non-linearity is removed, SPEN will be degenerated to an isometric transformation where only linear operations are involved. When the dimensions are limited to 2 or 3, the isometric transformation will have the intuitive and rudimentary geometric interpretation. In linear algebra, isometric transform is a linear operation which converts a vector from its original frame of reference into a different frame of reference. Isometric transform can be thought of as an augmentation of rotation, reflection and translation of lower dimension (2-D or 3-D) geometric objects into higher dimensions. Mathematically, isometric transform is expressed as a transform matrix multiplied by a vector. The way isometric transform can preserve privacy to some extent can be understood since the value on any of the dimensions in the new frame of reference is a blend of the values on all the dimensions of the original frame of reference.

In general, isometric transform has the property of preserving the distance of any two samples. This property helps assure that the structure of the dataset in the new frame of reference will be preserved as in the original frame of reference. This property is desired since it ensures that analytics can be conducted with isometrically transformed data samples. However, this property is also its limitation. For data analytics purposes, distance preservation is sometimes too strong of a condition; it is sufficient for structure preservation, but not necessary. One potential weakness of isometric transformation lies in the fact that it is a linear transformation. The isometrically transformed sample can be reversed by finding the inverse matrix of the isometric transformation. This property makes it much easier to reveal privacy when compared to nonlinear methods.

SPEN Architecture

To overcome the possible weakness of isometric transform, nonlinear operations can be added. The weighting and summing part in neural networks, for example, is a direct mapping of the linear transformation, and the activation function is a natural way of adding nonlinearity. Examples will be discussed in which neural networks convert a sample in its original plaintext domain to a corresponding sample in the ciphertext domain. This conversion using neural networks is referred to herein as Structure Preserving Encryption Networks (SPEN).

Though other implementation architecture and/or neural networks topologies are possible, for illustration purpose only, three exemplary types of configurations will be described in the context of using the neural networks framework to learn a ciphertext domain representation. Specifically, these configuration types include: Type h0: without hidden layers, Type h1: with only one hidden layer and Type hm: with multiple hidden layers).

In each configuration, the impact of network weights initialization, activation functions and network hyper-parameter selection on training progress will be described. In these configurations, the problem of learning a different representation in the ciphertext domain is modeled as a multidimensional regression problem, as akin to an autoencoder. In reality, this method applies to any data where each sample is expressed as a feature vector regardless of its actual interpretation. In an example, for the purpose of visualization convenience, two commonly used handwritten digits recognition dataset will be used, the 8×8 scikit-learn python package and the 28×28 MNIST dataset. The 8×8 scikit-learn dataset is used for the structure preserving network architecture exploration since the input vector dimension is smaller and training is generally much faster for hyper parameter exploration. To verify the effectiveness, the MNIST dataset is used to do analytics in the ciphertext domain. In addition, the Keras/Tensorflow platform may be used for training. The input of the network will be the original 8×8 pixels values flattened to be a 64-dimension vector. The expected output of the network will still be a 64-dimensional vector, which is the result of an equivalent generic mathematical transformation.

Note that the general purpose of training is not for the network to get the exact output as the reference value. Instead, a goal is for the network to reach a state which preserves the structure of the dataset in the original plaintext domain while some amount of nonlinearity is blended. This can be measured by the average relative distance difference between samples in both the plaintext and ciphertext domains. Also monitored is how the distance difference affects unsupervised learning (clustering) and supervised learning (classification) on the ciphertext data. When the difference is within an acceptable range, this can be related to the loss value in training, which in turn can be used to decide whether training should continue or stop.

In some embodiments, a Stochastic Gradient Descent (SGD) can be used as an optimizer with the parameters of: learning rate=0.1, decay=0.000001, momentum=0.9, nesterov=True, and the "mean_squared_error" as the loss function. 80% of the scikit-learn handwritten digits data may be used for training and 20% for validation. The pixel values may be scaled to the range between 0 to 1.0. In this specific case, a balance can be reached once the loss becomes lower than 0.000001, as an example. FIG. 2 includes a table with a summary of the different configurations.

Description will now be provided of various configurations relating to the use of the neural networks framework that converts samples from plaintext domain to ciphertext domain. FIGS. 3A, 3B, and 3C are graphs showing examples of training progress for different SPEN configurations.

Configuration Without Hidden Layers

The configuration without hidden layers is one in which the output layer is the only layer. Hence, this is a single layer configuration. In general, the single layer will not be able to approximate any specific function. However, since the expected output value is the result of a linear transformation, this maps very well with the weighting/summing part of a neuron. If an activation function is found which approximates a linear function with controllable nonlinearity, then certain goals may be achieved. The softplus function is an example activation function which satisfies the requirements, and where the amount of nonlinearity can be adjusted by selecting the work range of the input.

FIG. 3A is a graph showing training progress for different single-layer configurations. In particular, for a first sub-configuration (h0-10), guided initialization was used, where weights are initialized to an isometric transform matrix, and biases to the translation vector. In the second sub-configuration (h0-1), both weights and biases are randomly initialized. Loss decreases faster in the first case and the final loss value is lower (about 2:5×0.00001 vs 5.0×0.00001). Though the graph shows that a priori knowledge can play a dominant role in training speed-up, configuration without hidden layers is not usually used due to its theoretical limitation. This is because it is not guaranteed to be able to approximate any specific function as is also manifested in a large final loss value in this specific case.

Configuration With One Hidden Layer

FIG. 3B is a graph showing training progress for one hidden layer configurations. The universal approximation theorem guarantees that neural networks with one hidden layer can approximate any function with some conditions. Different activation functions and initializations will usually affect training, as will be described herein with 3 sub-configurations. Since the output of the networks will be vectors with value on each dimension being either positive, negative or zero, the output activation function should not be a rectified linear unit (ReLU) which only produces non-negative values. When TanH (hs-1) and ReLu (hs-2) are used in the hidden layers, it can be seen that TanH has a much better expression power as manifested in both decreasing speed and final value of the loss function, though ReLu performs better in many other cases.

Also consider whether guided initialization will bring better training performance in another sub-configuration (hs-3), where the weights of the hidden layer are initialized with the isometric transformation matrix and the weights of the output layer with an identity matrix. In this arrangement, sub-configuration (hs-3) is very similar to sub-configuration (hs-1) in terms of both loss decreasing speed and final loss value. One reason for this is that TanH is similar to an identity function only in a very narrow neighborhood around 0, while the slope differs greatly with 1.0, and nonlinearity becomes more dominant as the input moves away from 0. In this case, it is usually better to just let the neural networks' training find the optimized weights by itself.

Configuration With Multiple Hidden Layers

FIG. 3C is a graph showing training progress for three sub-configurations with multiple hidden layers for hyperparameter exploration, where the same number of layers and the same kind of activation function (TanH) are used. However, the number of neurons will be different on corresponding layers in the three sub-configurations. A small percentage of dropout (e.g. 0:01) is added to avoid the training getting trapped into local minima.

The differences among the three sub-configurations are shown in FIG. 3C. The number of neurons on each layer in the first sub-configuration (hm-1) is 64-128-64-128-64, the second sub-configuration is 64-48-128-48-64, and the third sub-configuration is a flat 64-64-64-64-64. As shown in FIG. 3C, the first sub-configuration performs much better than the second one, which is because too much information is lost due to only 48 neurons on the first hidden layer, while much more information is retained with 128 neurons. The first sub-configuration also performs better than the third sub-configuration, which is because the 128 neurons may have expressed the information in more and better ways for later layers to compose high level representations.

It should be noted that the difference between actual loss and validation loss in each sub-configuration is mainly due to the dropout as simulated in Keras. Validation loss is expected to better reflect actual loss in deployment whether the depicted model matches reality.

Analytics in Encrypted Domain

One feature of the present invention provides enhanced confidentiality (which in turn enhances privacy) by transforming data from plaintext domain to the structure-preserving ciphertext domain. Since the structure is still preserved, it is still possible to perform analytical operations in the ciphertext domain. For example, supervised and unsupervised learning can be performed in the ciphertext domain, Principal Component Analysis (PCA) can also be done in such ciphertext domain. In addition, we explore the addition of one or more dummy dimensions to further enhance privacy preservation during supervised learning, unsupervised learning, and other scenarios.

Unsupervised Learning in Encrypted Domain

Unsupervised learning may be done in the ciphertext domain using the same or similar techniques as in the plaintext domain. The 8×8 handwritten digit dataset in the scikit-learn machine learning Python library was used in this example. The 8×8 digit image of each sample was flattened to a 64-D vector in the plaintext domain and an encryption network was trained as described previously to convert each plaintext vector into another vector in the ciphertext domain. The K-means algorithm was used to cluster samples in both the plaintext domain and the ciphertext domain into 10 clusters, for example. Due to the difficulty in visualizing high dimensional data, principal component analysis (PCA) for dimensionality reduction and two dominant components in the K-means clustering algorithm were used.

FIGS. 4A-4D show clustering of points in the ciphertext and plaintext domains. In particular, FIG. 4A depicts data with original representation (PCA reduced), and FIG. 4B is a magnified portion of FIG. 4A. FIG. 4C depicts data clustering on SPEN (PCA reduced), and FIG. 4D is a magnified portion of FIG. 4C. As shown in these figures, the overall structure of the ciphertext domain is very similar to that of plaintext domain. However, the exact distance between points is not necessarily preserved after the transformation. For any arbitrary two samples, some might be pulled closer than before, and some might be a little farther away. This is different from linear-operation based isometric transformation. This expected and desired property enables machine learning activities in ciphertext domain while still preserving privacy.

Supervised Learning in Encrypted Domain

Application of supervised learning to plaintext and ciphertext domains by training classifiers on both domains to solve the handwritten digit number classification task in the MNIST dataset will now be discussed. As an example, the dataset consists of 28×28 pixel images of handwritten digits. In both domains, the 28×28 image is flattened to a 784-D vector and will be fed into a classification network. The MNIST convention of splitting the dataset into 60,000 training samples and 10,000 validation samples is followed, as an example. One purpose of these examples is to show that classification can be done in the ciphertext domain with comparable validation accuracy as in the plaintext domain, so the network topology is arbitrarily constructed based on intuition. The purpose in these examples is not to show what network architectures can achieve better validation accuracy, or have a smaller model size, or require fewer computation cycles, etc. A deep learning network consisting of nine fully-connected layers with dropout layers in-between was used.

FIG. 5 depicts a table showing error rates of different scenarios of input samples. The validation accuracy is compared with input from different domains and with security enhanced version of inputs with extra dummy dimensions.

Enhanced Security With Dummy Dimensions

Privacy concerns are not only on the value on each dimension of any individual sample, but also on the results of analytic activity. Even though nonlinearity in the neural networks makes it hard to recover plaintext from ciphertext, the same plaintext will be mapped to the same ciphertext. Similarly, a classification of a sample will generally give the same label, irrespective of the sample in plaintext domain or in ciphertext domain. We'll describe below how to go beyond this limitation and make the analytics results more secure.

One embodiment provides a solution which, upon submitting a plaintext sample multiple times, (1) generates different ciphertext each time and (2) yields different classification in the ciphertext domain each time. With the extra dummy-dimension scheme, each sample in the plaintext domain will be augmented by an additional dimension with a randomly generated value. This extra dummy dimension in the plaintext domain can not only randomize every dimension of input samples in the ciphertext domain, but can also be used to randomize the classification result in the same time.

For the former purpose, the random value will typically need to have a unimodal distribution with standard deviation small enough such that it is not a significant dominant component to interfere with clustering or classification results. For the latter purpose, the random value will typically need to have a multi-modal distribution, with the number of modes being determined by how many subclasses each class will be split into. The mapping of the subclass labels to the original label is a secret kept separate with the classifier. It is a many-to-one mapping with the number of possible mappings being combinatorial, and becoming astronomical as the number of classes or subclasses increase.

FIG. 6A shows a contrived low dimensional example in 2-D, and FIG. 6B shows a 3-D example, which illustrate how a dummy dimension will be added to split one class into two sub-classes.

FIGS. 6C, 6D, and 6E show examples of how to re-assign a label when an original class is split into two sub-classes. We will calculate the number of choices we have for this re-assignment and the hardness to reveal the secrecy is equivalent to find the actual one from many possible choices. In this case, if we assume that the order of every two rows in the right column (FIG. 6D) and the order within the two rows of the first column (FIG. 6E) do not matter, then we will have $20!/(((2!)^{10})*10!)=654,729,075$ choices. For the same example, if each class is split into two subclasses, the number of choices will be $30!/(((3!)^{10})*10!)=1,208,883,745,669,600,000$ choices.

Low and High Dimensionality

In some cases, the dimensionality in the plaintext domain may be too low, which may cause security concerns. Though the model size can be increased in the encryption networks to overcome this issue since networks model size is analogous to the key in conventional schemes, multiple dummy dimensions can be added, instead of a single dummy dimension, to solve the issue in this case.

In other cases, the dimensionality of the original plaintext domain may be too high, which may unnecessarily increase model size. One solution is combining dummy dimension and dimensionality reduction. In this case, a dummy dimension is first added in the plaintext domain, dimensionality reduction will then be applied. The pre-selected transform matrix and amount of nonlinearity will be applied to generate reference output samples in the ciphertext domain, and then neural networks will be trained for encryption. Note in this case, the dimension of the plaintext domain and the ciphertext domain will be different. The dummy dimension also serves to provide randomization in the ciphertext domain.

Referring again to the table of FIG. 5, recognition error rates are shown with regard to different versions of MNIST dataset samples being fed into the classification networks. In general, the error rates change within acceptable tolerance. There is a little increase of error rate between a plaintext sample and a purely isometric transformed ciphertext sample. When the ciphertext samples are generated from encryption neural networks, the error rate further increases a little, which is likely because some originally separable samples have been drawn closer and cannot be separated any more due to nonlinearity. Notably, the addition of a dummy dimension with single-mode distribution achieves almost the same error rate. There is a noticeable increase of error rate with the dummy dimension to split each class into multiple sub-classes, which is likely because the training samples become relatively fewer while the class numbers become relatively greater.

Security and Performance

Embodiments are generally based on insight different from conventional encryption schemes, but they should complement each other in application. These embodiments harvest the benefits of both worlds when combined with conventional schemes in some ways. For instance, one embodiment includes data crunching while conventional schemes are used to design protocols to enhance where such data crunching may have weakness. On the other hand, due to differences between the present embodiment and conventional schemes, security and analysis may be challenging by forcing it into the framework of the conventional schemes.

Key Generation and Management

In some embodiments, the encryption networks architecture and the weights/biases serve the same general purpose as the key in conventional cryptography. Since the length of the key is one measurement of strength of the key, the model size can be adjusted to proper length by adjusting the number of layers and the number of neurons on the layers.

Keys are generally generated with a unique random number each time a key is requested. In accordance with embodiments, a random number will not be directly used as key, rather, random sample vectors are generated, covariance matrix will be calculated and QR decomposition will be performed, where the Q-value will be used as an isometric transform matrix, which works together with a set of nonlinearity control parameter to generate reference output sample in ciphertext domain for a sample in the original plaintext domain. The weights and biases, which serve the same purpose as the key, are obtained through training.

Securing Each Individual Input Sample

Due to the intrinsic nonlinearity of the neural networks, it is difficult for attackers to reverse the ciphertext of a sample to find its plaintext. Due to the additional enhancement provided by dummy dimensions, it is extremely difficult for attackers to collect plaintext/ciphertext pairs for crypto analysis, since the same sample will show up differently every time due to the random values on the dummy dimensions.

Even if the attacker can collect a large amount of plaintext/ciphertext pairs, it is still difficult for the attackers to find the sample in the plaintext domain from its associated vector in the respective ciphertext domain. The attackers may try to build other neural networks to learn the plaintext from the cipher text, however, this will still be difficult since the loss cannot reach zero in general during training, thus a perfect complete reversal is impractical in reality.

PCA Analysis and Performance

As the overall structure of the dataset is preserved and perturbations will only manifest locally with neighboring samples, some statistics can still be obtained through PCA. For example, the eigenvalues obtained from PCA will indicate how dominant each component will be when compared to others. The eigenvalues should be roughly the same whether PCA is done in the plaintext domain or in the ciphertext domain. However, PCA can only reveal limited information. For example the eigenvectors can only be expressed in ciphertext domain if PCA is done in the ciphertext domain. Due to the lack of information in the nonlinear transform which is equivalent to the inverse transform matrix and the translation vector in the linear transform, it is difficult to obtain more information in the plaintext domain through PCA in the ciphertext domain.

An advantage of embodiments disclosed herein is that PCA analysis can actually be done very efficiently when compared to conventional homomorphic schemes. Theoretically PCA analysis takes the same time as with the instant embodiments, whether in the plaintext domain or in the ciphertext domain, while for conventional homomorphic encryption schemes, PCA analysis may take inhibitive long time. An example of this is shown in FIG. 7, which depicts a table showing execution times comparison among homomorphic encryption, plaintext, and SPEN, where N denotes number of samples and P denotes number of principle components. As shown in this table, SPEN takes a few dozens of milliseconds while conventional homomorphic encryption takes hours.

The MNIST dataset based handwritten digits recognition error rate and PCA computation time showcase the superiority of SPEN over conventional methods (e.g., homomorphic encryption). As an example (as shown in FIG. 7), SPEN is 2.7×100000 times faster than homomorphic encryption when computing principal components. It should be noted that this big difference in execution time comes from the fundamental pre-condition that our network transformation preserves structure while no such constraint is needed in conventional encryption schemes. Consequently, SPEN's application can scale from resource constrained embedded devices (e.g., IoT devices) to heavy processing data centers.

While in many actual implementations, the elegance of modern neural networks and associated training methods can handle the blending of structure preservation, linear and/or nonlinear transformation, nonlinear perturbation controlling, etc. in a very nice way, the following will provide some easy-to-understand descriptions from the perspective of traditional transform to understand the insight for those who are not very familiar with modern machine learning technology.

Isometric Transformation as a Degenerated Case

Addressing again isometric transformation using a more detailed mathematical approach, consider that isometry can be defined as a bijective mapping between metric spaces where the transformation preserves the distance between spaces. More generic transformations can be further realized using the neural network framework. In the case of mapping matrix multiplication to a neural network structure, input data can be mapped to elements of the input nodes of a fully connected layer.

Though the topology can be very flexible, a neural network typically consists of layers followed by layers sequentially, with activation functions in between. Convolution and fully connected layers provide the weighted sum operations of linear transforms, while other layers such as activations and poolings etc. provide non-linearity in general. Isometric transform can be implemented as a degenerated special case when there is no activation functions in between or the activation functions happen to be linear. Nevertheless, nonlinear activation and other nonlinear layers are normally used to enable more flexible and powerful expressivity in mathematical function approximation, which is also the case for SPEN where nonlinearity was employed to make it hard to find inverse function and thus enhance security.

When incorporating isometric transformation into the DNN framework, it is preferable to utilize some random biases. For example, this bias can be generated from true random number generators (TRNG)s, which in turn will increase the security of the system.

In a typical DNN embodiment, a generic transformation can be implemented with multiple layers with nonlinear activations in between. The compounding effect of non-linearity on multiple layers has the advantage of providing enhanced security. There are many ways to incorporate nonlinearity with this embodiment on the base of linear transform. For example, the blocking algorithm of matrix multiplication can be modified to suit this purpose.

Linear Transformation as a Special Case

Addressing now linear transformations, in such schemes, the plaintext data (input sample) is treated as a multi-dimensional vector. In the case of large sized plaintext data blocks, data is fragmented into smaller block sizes and subsequently mapped to the corresponding multi-dimensional vectors. Each input sample is processed with a distance preserving transformation before applying any data mining techniques. A feature of this transformation is to preserve the distribution pattern and structure of input sample data while projecting it into a different high-dimensional space.

Moreover, the foundation for this transformation is based on well-defined mathematical properties, where its realizations are expressed as a matrix multiplication followed by a matrix addition (or alternatively one augmented form of matrix multiplication which embeds the matrix addition into matrix multiplication). In terms of geometrical interpretation which is only possible in 2-D and 3-D dimensions, the transformation can be visualized as a rotation/reflection and translation of sample data in lower dimensions. The need for strict distance preserving realizations is expunged and in some cases is advantageous since minor perturbations can increase security. The net effect of perturbing isometric transformation with nonlinearity can be realized using DNN.

With the explosion of data and its pervasive access, ensuring privacy at each step of the data processing is desired for holistic data protection. Most models require unencrypted data for training neural networks. However, such a requirement defeats the sole purpose of protecting privacy by exposing data while training the network. Hence, in order to ensure privacy even while training, various embodiments presented herein facilitate a privacy-preserving training approach to address any such privacy concerns.

In some embodiments, the classification process adds another dimension. For instance, if data is represented in one dimension, classification can be challenging given the close congregation of data points. However, by the addition of another dimension (also referred to herein as a dummy dimension) and projecting the same data in the two-dimensional space, the data can be classified with ease and with higher accuracy levels.

Analogous to this approach, a dummy dimensional value may be added to the original data. In this scenario, augmented data with dummy dimension is sent to the cloud after transformation for analytics processing (for example, classification). Hence, the classifier will not be able to recognize the original data and all the analytics processing is performed on the transformed data, the original data is never exposed to the cloud and this ensures a level of data privacy.

For example, FIG. 8 depicts a privacy-preserving classification in which dummy dimensions are added to data points (Ai), thereby protecting the privacy of the original data. Please note that, though not drawn explicitly in the figure, the data sent to the cloud is assumed to have been transformed, and the value of the dummy data on each sample is also a different random number in general. Each of these resultant components (Ai+dm) are mapped to a label. Therefore, when these resultant components are shared to a third-party (e.g. cloud platform) or other location, the cloud does not know the original identity of the dataset but can still perform operations such as classification. In this case, the cloud receives (A1+dm) and classifies it as A2.

When the client receives A2 in response to the input value (A1+dm), it remaps A2 to its corresponding label, and uncovers the true output of the classifier.

Addressing further data security, true random number generators (TRNG) can be leveraged to generate random samples which will be used to calculate the co-variance matrix A (which in turn is used to generate the Q and R values). Furthermore, the transformation can be based on the hardness assumptions stemming from the discrete log problem. If the input values (Vi) can be mapped to a point on the elliptic curve, then security can be based on the elliptic curve discrete logarithm problem.

In the case of nonlinear transformations, the advantage of adding non-linearity at each hidden node is to make it even harder for the attacker to break the transformation.

Various transformation embodiments can be experimented using assorted datasets, including the Iris flower dataset and the hand-written digit dataset. The Iris flower dataset is a multivariate set that includes 150 samples where each sample is a 4-dimensional vector and annotated with 3 flow types (Setosa, Versicolour, and Virginica). The hand-written digit dataset includes 1797 samples where each sample is a 64 dimensional vector and annotated with 10 digits.

Samples in each of the Iris flower dataset and the hand-written digit dataset can be randomly shuffled and 80% of these samples set aside for training while the remaining 20% are allocated for testing. With reference to classifier training, one classifier (SVM) is trained based on original data and its test rate is calculated. The model used for learning is based on the radial basis function (which leverages on a Gaussian function that is mapped to the non-linearity of each hidden node). FIG. 9 is a graph depicting an example of such a Gaussian function. Similarly, another classifier is trained on the transformed data and its corresponding test rates are computed. In conclusion, the two error rates were generally identical within tolerance and the transformation did not affect the classification process.

FIG. 10 depicts the transformation of a handwritten digit 6. As can be seen from the transformed image, the original correlation between different dimensions are completely scrambled, and it becomes difficult to make sense of what the image represents. With nonlinearity added, the mapping function essentially becomes a non-reversible function (in general, the reverse function will not even exist), and this will become even harder to unscramble.

FIG. 11 is a flowchart of a method for providing ciphertext data by a first computing device in accordance with embodiments of the present invention.

As performed by a first device 1600, one operation includes obtaining, from the memory of the first device, plaintext data having a structure. Block 1615 includes providing the plaintext data to a structure preserving encryption network (SPEN) to generate the ciphertext data, where the structure of the plaintext data corresponds to a structure of the ciphertext data.

Block 1620 includes communicating, from the first device 1600 to a second device 1605, the ciphertext data to permit analysis on the ciphertext data. The analysis can be performed by the second device, as shown in block 1625, or such analysis can be performed by other computing devices. After the analysis is completed, it is communicated to the first device by, for example, the second device (block 1630). The first and second devices may be implemented as computing devices, examples of which are set out with regard to FIG. 12, as will now be described.

FIG. 12 is a block diagram of a cloud network environment in accordance with the present disclosure. In accordance with embodiments of the present invention, the assorted devices presented herein, may be variously implemented using some or all of the features of device 1700. Examples of such devices include sensors, mobile devices, base stations, network servers, cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like. By way of non-limiting example only, description herein is made with reference to particular types of devices. However, such teachings apply equally to other types of devices. In addition, these teachings may also be applied to stationary terminals or devices such as digital TV, desktop computers, and the like.

Device 1700 includes a wireless communication unit 1705, memory 1710, and a controller 1715. FIG. 12 illustrates the device having various components, but it is understood that implementing all of the illustrated components is not a requirement, and that greater or fewer components may alternatively be implemented. Communication unit 1705 typically includes one or more modules which provide wired or wireless communications between the device 1700 and a communication system or network (e.g., network 1750), between the device and another device, between the device and an external server (e.g., server 1755), and other communications.

In some embodiments, communication unit 1705 may transmit/receive wireless signals to/from at least one network entity such as, for example, a base station, an external terminal, a server, and the like, of a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

If desired, communication unit 1705 may alternatively or additionally transmit/receive wireless signals via communication networks according to wireless Internet technologies. Examples of such wireless Internet access include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. Other suitable technologies for implementing short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like.

The memory 1710 may store a plurality of application programs (or applications) executed in the device 1700, data for operations of the device 1700, instruction words, and the like. The memory 1710 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a secure memory, a magnetic disk, and an optical disk. Also, the device 1700 may be operated in relation to a web storage device that performs the storage function of the memory 1710 over the Internet or other network.

The controller 1715 may typically control the general operations of the device 1700, along with performing various schemes and operations presented herein (e.g., operations of FIG. 11, among other figures). As such, various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The example of FIG. 12 shows device 1700 in network communication with server 1755 via network 1750. Server 1755 may be configured using any of the various components described with regard to device 1700. In addition, the single network, device, and server arrangement of FIG. 12 is an example, and greater or fewer of any of such elements may alternatively be implemented. In some embodiments, all desired operations can be performed by a single computing device, such as device 1700.

Various embodiments of the present invention have been described, but still further features may alternatively or additionally be implemented in accordance with alternative embodiments of the present invention. Although embodiments may be implemented using the exemplary series of operations described herein (e.g., in conjunction with the various flowcharts discussed above), additional or fewer operations may be performed.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

Mode for the Invention

The various modes for the present invention are described in the above Best Mode.

INDUSTRIAL APPLICABILITY

The present invention has an industrial applicability, because the present invention can be applied to mobile devices, sensors and so on, as discussed above.

The invention claimed is:

1. A method for providing ciphertext data by a first computing device having memory, the method comprising:
   obtaining, from the memory, plaintext data having a structure, wherein the structure of the plaintext data is an N dimension structure;
   adding K dummy dimensions to the plaintext data to cause the plaintext data to have N+K dimensions, wherein the N and the K are positive integers, and wherein each dummy dimension of the K dummy dimensions comprises a randomly generated value;
   providing the plaintext data, having the N+K dimensions and the randomly generated value of each of the K dummy dimensions, to a structure preserving encryption network (SPEN) to generate the ciphertext data, wherein the structure of the plaintext data corresponds to a structure of the ciphertext data, and wherein a number of the N+K dimensions of the plaintext data is different than a number of dimensions of the ciphertext data while in the ciphertext domain; and communicating, from the first computing device to a second computing device, the ciphertext data, wherein the structure of the ciphertext data permits analysis on the ciphertext data by the second computing device while in a ciphertext domain.

2. The method of claim 1, wherein the structure of the ciphertext data is a non-linear transform of the structure of the plaintext data.

3. The method of claim 1, further comprising:

receiving, from the second computing device, the analysis on the ciphertext data.

4. The method of claim 1, wherein the memory is secure memory.

5. The method of claim 1, wherein the communicating is via a communication network.

6. The method of claim 1, further comprising:

performing a non-linear transform by a neural network on the structure of the plaintext data to generate the ciphertext data.

7. An apparatus for providing ciphertext data, the apparatus comprising:

a memory configured to store plaintext data having a structure, wherein the structure of the plaintext data is an N dimension structure;

a communication unit; and a controller operatively coupled to the communication unit, wherein the controller is configured to:

add K dummy dimensions to the plaintext data to cause the plaintext data to have N+K dimensions, wherein the N and the K are positive integers, and wherein each dummy dimension of the K dummy dimensions comprises a randomly generated value;

provide the plaintext data, having the N+K dimensions and the randomly generated value of each of the K dummy dimensions, to a structure preserving encryption network (SPEN) to generate the ciphertext data, wherein the structure of the plaintext data corresponds to a structure of the ciphertext data, and wherein a number of the N+K dimensions of the plaintext data is different than a number of dimensions of the ciphertext data while in the ciphertext domain; and cause the communication unit to communicate, to a computing device, the ciphertext data, wherein the structure of the ciphertext data permits analysis on the ciphertext data by the computing device while in a ciphertext domain.

8. The apparatus of claim 7, wherein the structure of the ciphertext data is a non-linear transform of the structure of the plaintext data.

9. The apparatus of claim 7, wherein the controller is further configured to:

receive, from the computing device, the analysis on the ciphertext data.

10. The apparatus of claim 7, wherein the memory is secure memory.

11. The apparatus of claim 7, wherein the communicating of the ciphertext data is via a communication network.

12. The apparatus of claim 7, wherein the controller is further configured to:

perform a non-linear transform by a neural network on the structure of the plaintext data to generate the ciphertext data.

13. A computer program product comprising a non-transitory computer readable medium having a computer readable program stored therein, wherein the computer readable program, when executed by a first computing device, causes the first computing device to:

obtain, from a memory of the first computing device, plaintext data having a structure, wherein the structure of the plaintext data is an N dimension structure;

add K dummy dimensions to the plaintext data to cause the plaintext data to have N+K dimensions, wherein the N and the K are positive integers, and wherein each dummy dimension of the K dummy dimensions comprises a randomly generated value;

provide the plaintext data, having the N+K dimensions and the randomly generated value of each of the K dummy dimensions, to a structure preserving encryption network (SPEN) to generate ciphertext data, wherein the structure of the plaintext data corresponds to a structure of the ciphertext data, and wherein a number of the N+K dimensions of the plaintext data is different than a number of dimensions of the ciphertext data while in the ciphertext domain; and communicate, from the first computing device to a second computing device, the ciphertext data, wherein the structure of the ciphertext data permits analysis on the ciphertext data by the second computing device while in a ciphertext domain.

14. The computer program product of claim 13, wherein the computer readable program, when executed by the first computing device, further causes the first computing device to:

perform a non-linear transform by a neural network on the structure of the plaintext data to generate the ciphertext data.

* * * * *